(12) United States Patent
Nakao

(10) Patent No.: US 12,280,690 B2
(45) Date of Patent: Apr. 22, 2025

(54) METHOD AND APPARATUS FOR CONTROLLING CHARGING OF VEHICLE

(71) Applicant: TOYOTA JIDOSHA KABUSHIKI KAISHA, Toyota (JP)

(72) Inventor: Kenji Nakao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 686 days.

(21) Appl. No.: 17/670,826

(22) Filed: Feb. 14, 2022

(65) Prior Publication Data

US 2022/0289062 A1 Sep. 15, 2022

(30) Foreign Application Priority Data

Mar. 11, 2021 (JP) .................................. 2021-039310

(51) Int. Cl.
*H02J 7/00* (2006.01)
*B60L 53/14* (2019.01)
*B60L 53/66* (2019.01)

(52) U.S. Cl.
CPC .............. *B60L 53/66* (2019.02); *B60L 53/14* (2019.02); *H02J 7/00045* (2020.01); *H02J 7/00047* (2020.01)

(58) Field of Classification Search
USPC ......... 320/106, 107, 108, 109, 110, 111, 112
See application file for complete search history.

(56) References Cited

U.S. PATENT DOCUMENTS

| | | | |
|---|---|---|---|
| 2015/0061576 A1* | 3/2015 | Chen ..................... | B60L 53/37 320/108 |
| 2015/0084584 A1* | 3/2015 | Monks .................... | H02J 50/80 320/108 |

(Continued)

FOREIGN PATENT DOCUMENTS

WO 2018/069192 A1 4/2018

OTHER PUBLICATIONS

Cenelec, "Focus Group on European Electro-Mobility Standardization for road vehicles and associated infrastructure Report in response to Commission Mandate M/468 concerning the charging of electric vehicles", IEEE Draft; ITS(12)000065_Report_in_Response_to_Commission_Mandate_M_468_Concerning_TH, IEEE—SA, Piscataway, NJ USA, vol. 802.11 ETSI ITS, Version 2, Oct. 2011, URL:http://www.ieee802.org/11/private/ETSI_documents/ITS /05-CONTRIBUTIONS/2012/ITS(12)000065_Report_in_response_to_Commission_Mandate_M_468_concerning_th.pdf (155 pages total).

*Primary Examiner* — Brian Ngo
(74) *Attorney, Agent, or Firm* — Sughrue Mion, PLLC

(57) ABSTRACT

A first charging standard adopts a Wi-Fi (BLE) communication, and defines automatic charging. A second charging standard adopts an Ethernet (IPoverCAN) communication and defines PnC. A third charging standard adopts a PLC communication and defines universal charging scheme. A fourth charging standard adopts a CAN communication and defines DC (direct-current) charging. A fifth charging standard adopts a CPLT communication and defines AC (alternating-current) charging. The method includes: performing a first connection attempt process in accordance with a communication scheme adopted by a charging standard that has the highest priority; and, when no communication is established by the first connection attempt process, performing a second connection attempt process in accordance with (Continued)

a communication scheme adopted by a charging standard that has the second highest priority. The charging standard adapting the wireless communication scheme has a higher priority than the charging standard adapting the wired communication scheme.

10 Claims, 11 Drawing Sheets

(56) References Cited

U.S. PATENT DOCUMENTS

| | | | |
|---|---|---|---|
| 2015/0270719 A1* | 9/2015 | Kurs | H02J 50/80 |
| | | | 320/108 |
| 2016/0059725 A1* | 3/2016 | Kim | B60L 53/00 |
| | | | 320/108 |
| 2020/0122594 A1 | 4/2020 | Ichikawa | |

* cited by examiner

《MANUAL CHARGING》

《AUTOMATIC CHARGING》

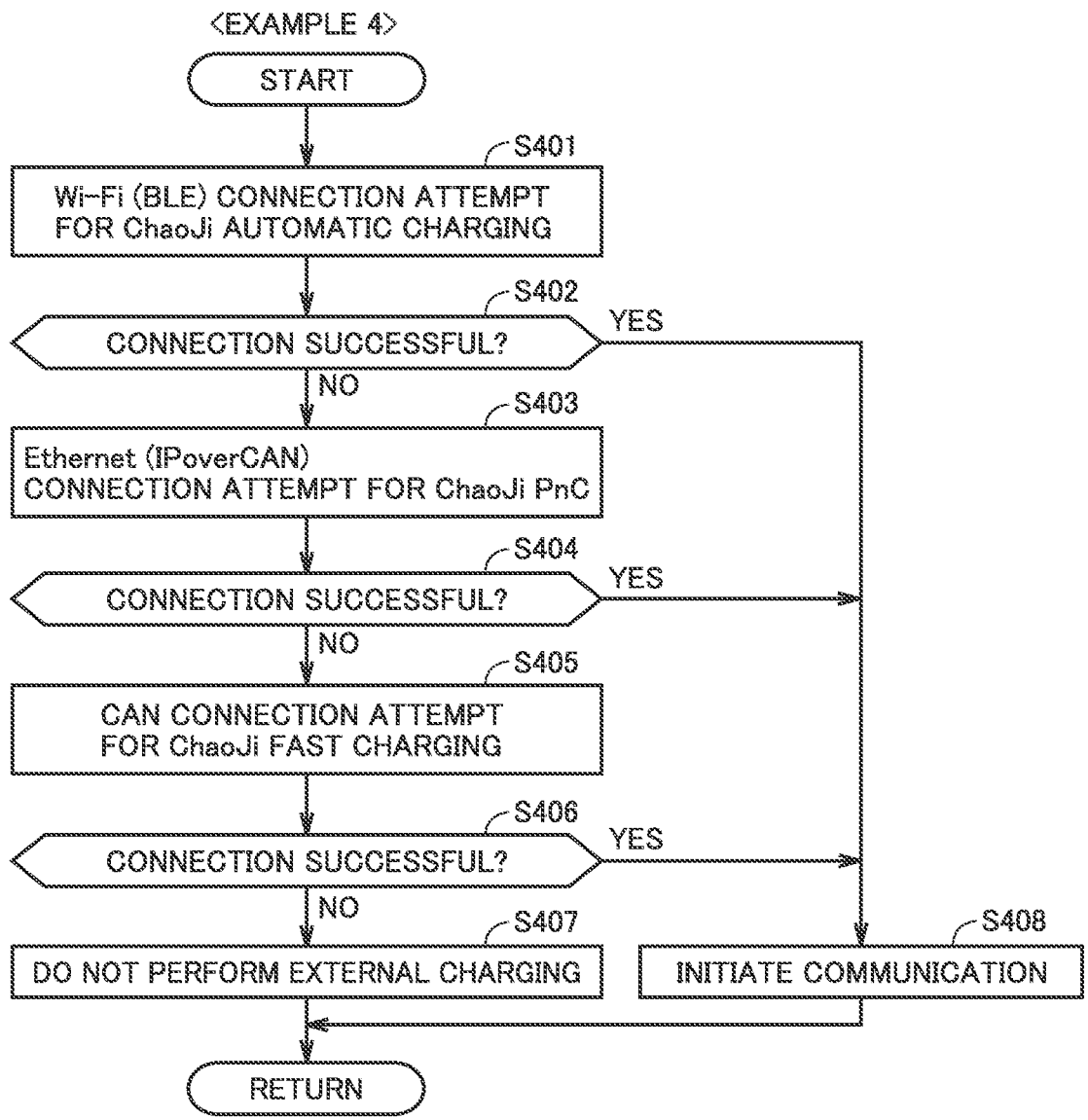

METHOD AND APPARATUS FOR CONTROLLING CHARGING OF VEHICLE

This nonprovisional application is based on Japanese Patent Application No. 2021-039310 filed on Mar. 11, 2021 with the Japan Patent Office, the entire content of which is hereby incorporated by reference.

BACKGROUND

Field

The present disclosure relates to a method and an apparatus for controlling charging of a vehicle, and, more particularly, to a method and an apparatus for controlling charging of a vehicle using electric power supplied from charging equipment.

Description of the Background Art

Vehicles, such as plug-in electric hybrid vehicles or battery electric vehicles, are increasing popular which can be charged with electric power supplied from charging equipment. Such charging is also called "external charging." As charging standards of external charging, DC charging (fast charging) standards are developed, in addition to conventional AC charging (normal charging) standards. There exists several charging standards as the fast charging standards, such as CHAdeMO (registered trademark) by Japan, GB/T by China, and CCS (Combined Charging System) by the United States and Europe, etc. Aiming at further reduction in charging time, Japan and China, in conjunction, are developing a new standard called ChaoJi.

In light of these circumstances, a technology is proposed which enables external charging in any of two or more charging standards. For example, WO 2018/69192 discloses intelligent charge communication switching in CAN (Controller Area Network)-based charging system.

SUMMARY

Charging equipment complying with different charging standards coexist in the market. Thus, vehicles may encounter various kinds of charging equipment complying with different charging standards. When performing external charging of a vehicle, prior to the actual start of supply of electric power, it is required that the communication is established between the vehicle and the charging equipment and various information are exchanged between the two. However, the communication scheme used between the vehicle and the charging equipment can differ for each charging standard. Accordingly, for a vehicle that can perform external charging according to two or more charging standards, desirably, a suitable communication scheme is selected according to a charging standard which the charging equipment conforms to. If a suitable communication scheme is not selected, the vehicle cannot leverage excellent features provided by the charging equipment. As a result, a user or the vehicle cannot benefit from such features.

The present disclosure is made in view of the above problem, and an object of the present disclosure is to allow a vehicle, which is capable of external charging according to two or more charging standards, to leverage features that can be provided by charging equipment.

(1) A method for controlling charging of a vehicle according to a certain aspect of the present disclosure controls charging of the vehicle using electric power supplied from charging equipment. The vehicle conforms to a plurality of charging standards. The plurality of charging standards include a charging standard adapting a wireless communication scheme and a charging standard adapting a wired communication scheme. The method includes a first step and a second step. The first step performs a first connection attempt process for establishing a communication between the vehicle and the charging equipment, in accordance with a communication scheme adopted by a charging standard that has a predetermined highest priority among the plurality of charging standards. The second step performs, when the communication between the vehicle and the charging equipment is not established at the first connection attempt, a second connection attempt process in accordance with a communication scheme adopted by a charging standard that has a second highest priority among the plurality of charging standards. The charging standard adapting the wireless communication scheme has a higher priority than the charging standard adapting the wired communication scheme.

(2) The charging standard adapting the wireless communication scheme includes a first charging standard. The charging standard adapting the wired communication scheme includes at least one charging standard, among a second charging standard, a third charging standard, a fourth charging standard, and a fifth charging standard different from each other. The first charging standard is a charging standard which adapts a wireless communication scheme and defines automatic charging in which a charging plug of the charging equipment is inserted into an inlet of the vehicle without user manipulation. The second charging standard is a charging standard which adapts a wired communication scheme and defines: manual charging in which the charging plug is inserted into the inlet through the user manipulation; and Plug & Charge in which charging of the vehicle starts once the charging plug is inserted into the inlet, obviating user authentication. The third charging standard is a charging standard which adapts a wired communication scheme and defines direct-current (DC) charging and alternating-current (AC) charging. The fourth charging standard is a charging standard which adapts a wired communication scheme and defines only the DC charging among the DC charging and the AC charging. The fifth charging standard is a charging standard which adapts a wired communication scheme and defines only the AC charging among the DC charging and the AC charging. The first charging standard has a higher priority than the second charging standard, the third charging standard, the fourth charging standard, and the fifth charging standard.

In the method according to (1) and (2) above, priorities of the charging standards are set, and the vehicle performs a connection attempt process according to a charging standard, starting from the highest priority to the lowest priority. The charging standard adapting the wireless communication scheme has a higher priority than the charging standard adapting the wired communication scheme. Accordingly, the communication can be established between the charging equipment and the vehicle, without having to insert the charging plug of the charging equipment into the inlet of the vehicle by user manipulation.

(3) Priorities of the first charging standard, the second charging standard, the third charging standard, the fourth charging standard, and the fifth charging standard are in order starting from a highest priority to a lowest priority.

In the method according to (3) above, automatic charging is performed according to the first charging standard having the highest priority, and thus improves the user convenience, as compared to the cases where manual charging is performed according to the second to fifth charging standards. Moreover, Plug & Charge is performed according to the second charging standard having the second highest priority, which obviates the need for the user authentication, and thus allows improvement in user convenience. DC charging is performed according to the fourth charging standard having the fourth highest priority, and the charging time can thus be reduced, as compared to performing AC charging according to the fifth charging standard. Thus, according to the method of (3) above, a suitable communication scheme can be selected, and the vehicle can leverage the features that can be provided by the charging equipment.

(4) The method further includes performing, when no communication is established between the vehicle and the charging equipment at the second connection attempt process, a third connection attempt process in accordance with a communication scheme adopted by a charging standard that has a third highest priority among the plurality of charging standards.

(5) The method further includes performing, when no communication is established between the vehicle and the charging equipment at the third connection attempt process, a fourth connection attempt process in accordance with a communication scheme adopted by a charging standard that has a fourth highest priority among the plurality of charging standards.

(6) The method further includes performing, when no communication is established between the vehicle and the charging equipment at the fourth connection attempt process, a fifth connection attempt process in accordance with a communication scheme adopted by a charging standard that has a lowest priority among the plurality of charging standards.

According to the method of (4) to (6) above, even when the vehicle conforms to three or more types of charging standards among the first to the fifth charging standards, a suitable communication scheme can be selected and the vehicle can leverage the features that can be provided by the charging equipment, as with the method according to (1) above.

(7) The wireless communication scheme adopts a wireless fidelity (Wi-Fi) protocol or a Bluetooth low energy (BLE) protocol. The wired communication scheme adopts a controller area network (CAN) protocol, a power line communication (PLC) protocol, an Ethernet (registered trademark) protocol, an Internet protocol over controller area network (IPoverCAN) protocol, or a communication protocol which uses a control signal.

The vehicle can use a suitable communication protocol and leverage features that can be provided by the charging equipment even when one of specific communication protocols as stated in (7) above is adopted.

(8) An apparatus for controlling charging of a vehicle according to another aspect of the present disclosure controls charging of the vehicle using electric power supplied from charging equipment. The vehicle conforms to a plurality of charging standards. The plurality of charging standards include a charging standard adapting a wireless communication scheme and a charging standard adapting a wired communication scheme. The apparatus the apparatus: performs a first connection attempt process for establishing a communication between the vehicle and the charging equipment, in accordance with a communication scheme adopted by a charging standard that has a highest predetermined priority among the plurality of charging standards; and performs, when the communication between the vehicle and the charging equipment is not established at the first connection attempt process, a second connection attempt process in accordance with a communication scheme adopted by a charging standard that has a second highest priority among the plurality of charging standards. The charging standard adapting the wireless communication scheme has a higher priority than the charging standard adapting the wired communication scheme.

(9) The charging standard adapting the wireless communication scheme includes a first charging standard. The charging standard adapting the wired communication scheme includes at least one charging standard, among a second charging standard, a third charging standard, a fourth charging standard, and a fifth charging standard different from each other. The first charging standard is a charging standard which adapts a wireless communication scheme and defines automatic charging in which a charging plug of the charging equipment is inserted into an inlet of the vehicle without user manipulation. The second charging standard is a charging standard which adapts a wired communication scheme and defines: manual charging in which the charging plug is inserted into the inlet through the user manipulation; and Plug & Charge in which charging of the vehicle starts once the charging plug is inserted into the inlet, obviating user authentication. The third charging standard is a charging standard which adapts a wired communication scheme and defines direct-current (DC) charging and alternating-current (AC) charging. The fourth charging standard is a charging standard which adapts a wired communication scheme and defines only the DC charging among the DC charging and the AC charging. The fifth charging standard is a charging standard which adapts a wired communication scheme and defines only the AC charging among the DC charging and the AC charging. The first charging standard has a higher priority than the second charging standard, the third charging standard, the fourth charging standard, and the fifth charging standard.

(10) Priorities of the first charging standard, the second charging standard, the third charging standard, the fourth charging standard, and the fifth charging standard are in order starting from a highest priority to a lowest priority.

According to the configurations (8) to (10) above, the vehicle can use a suitable communication scheme and leverage features that can be provided by the charging equipment, as with the method according to (1) to (3) above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 12 is a flowchart illustrating a communication connection process between the vehicle and a charging station, according to Example 4.

DESCRIPTION OF THE PREFERRED EMBODIMENTS

Hereinafter, an embodiment according to the present disclosure will be described in detail, with reference to the accompanying drawings. Note that the same reference sign is used to refer to the same or like parts, and the description thereof will not be repeated.

Embodiment

System Configuration

Figure 1:
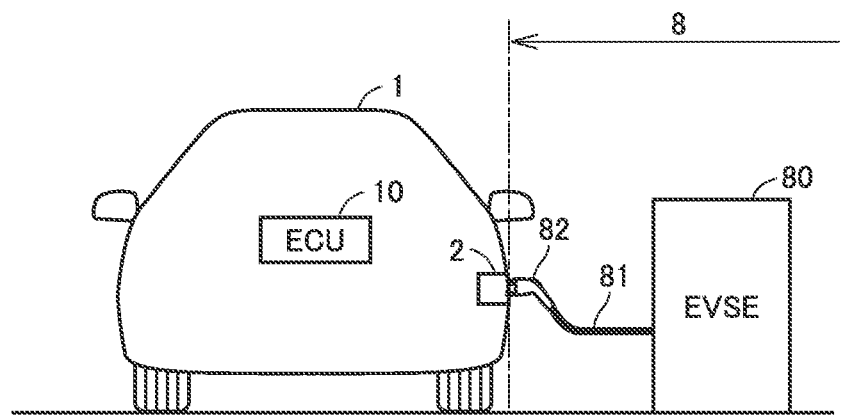
FIG. 1 is a diagram showing a way of external charging of a vehicle, according to the present embodiment.
Figure 2:
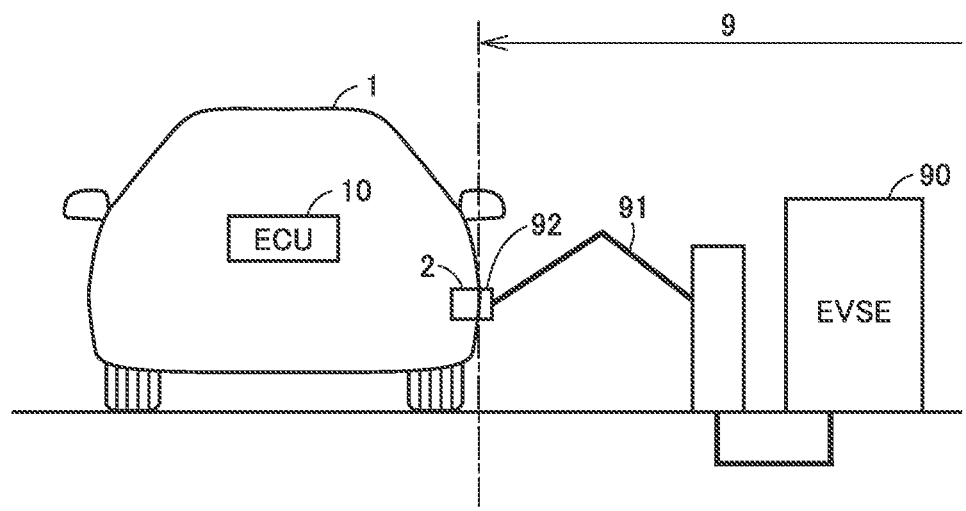
FIG. 2 is a diagram showing another way of external charging of the vehicle according to the present embodiment.

FIG. 1 is a diagram showing a way of external charging of a vehicle according to the present embodiment. FIG. 2 is a diagram showing another way of external charging of a vehicle according to the present embodiment. A vehicle 1 is capable of external charging according to two or more charging standards described later. The vehicle 1 is, typically, a battery electric vehicle (BEV). However, the type does not matter insofar as the vehicle 1 is capable of external charging. The vehicle 1 may be a plug-in hybrid electric vehicle (PHEV) or a plug-in fuel cell electric vehicle (PFCEV), for example.

Referring to FIG. 1, a charging station (charging equipment) 8 includes a charger (charger body) 80, a charging cable 81 extending from the charger 80, and a charging plug 82 attached to a tip of the charging cable 81. The vehicle 1 includes an inlet unit 2 and an electronic control unit (ECU) 10.

The inlet unit 2 insertably receives the charging plug 82, involving mechanical coupling, such as fitting. As a user (a driver of the vehicle 1 or an operator of the charging station 8) inserts the charging plug 82 into the inlet unit 2, the vehicle 1 and the charger 80 are connected together via the charging cable 81. This ensures electrical connection for transmission of electric power between the vehicle 1 and the charger 80, and allows the vehicle 1 and the charger 80 to transmit/receive various signals (commands, messages, or data, etc.) to/from each other. In the present embodiment, the inlet unit 2 includes inlets (specifically described later) conforming to different charging standards.

The ECU 10 includes: a processor, such as a central processing unit (CPU); a memory, such as a read only memory (ROM) and a random access memory (RAM); and input/output ports, none of which are shown. Based on programs stored in the memory and the signals from various sensors, the ECU 10 coordinates with a controller (not shown) within the charger 80 to control external charging of the vehicle 1.

The charging station 8 connects the vehicle 1 and the charger 80 by the charging cable 81 by user manipulations. In contrast, a charging station 9, shown in FIG. 2, is an automatic charging system capable of automatic charging of the vehicle 1 without requiring user's hands. For example, the charging station 9 includes a charger (charger body) 90, a movable arm 91 having an electric power cable (not shown) disposed therein, and a charging plug 92 provided on a tip of the movable arm 91.

A controller (not shown) within the charger 90 controls the movable arm 91, based on an image of the vehicle 1 captured by a camera (not shown). The control on the movable arm 91 moves the charging plug 92 toward the inlet unit 2 of the vehicle 1, and the charging plug 92 is eventually inserted into the inlet unit 2. The insertion of the charging plug 92 into the inlet unit 2 ensures electrical connection for transmission of electric power between the vehicle 1 and the charger 90.

Multiple Charging Standards

During external charging of the vehicle 1 using electric power supplied from the charging station 8, various signals are exchanged between the vehicle 1 and the charging station 8 (the charger 80). Thus, prior to the actual supply of electric power, it is required that a communication is initially established between the vehicle 1 and the charging station 8. Similarly, when the charging station 9 is used, it is required that a communication is initially established between the vehicle 1 and the charging station 9 (the charger 90). However, a charging standard to which the manual charging station 8 conforms and a charging standard to which the charging station 9, capable of automatic charging, conforms can have different communication schemes. There are also various charging standards to which the charging station 8 conforms, such as CHAdeMO, CCS, GB/T, ChaoJi, etc.

For the vehicle 1 that is capable of external charging according to two or more charging standards, it is desirable that the vehicle 1 selects a suitable communication scheme depending on a charging station. If a suitable communication scheme is not selected, the vehicle 1 cannot leverage convenience features (described later) provided by the charging station, and the user of the vehicle 1 may not be able to benefit from the convenience of the charging station. Alternatively, the capability of the charging station for controlling the charging current (or the charging power) may not be fully exploited.

In order to establish a communication between the vehicle 1 and the charging station, the vehicle 1 attempts a communication connection to the charging station. Hereinafter, this attempt may also be referred to as a "connection attempt." In the present embodiment, priorities are previously set to the charging standards for use in external charging of the vehicle 1. The vehicle 1 makes a connection attempt in accordance with a communication scheme defined in a charging standard, starting from a charging standard having the highest priority to a charging standard having the lowest priority.

Priorities of Charging Standards

Figure 3:
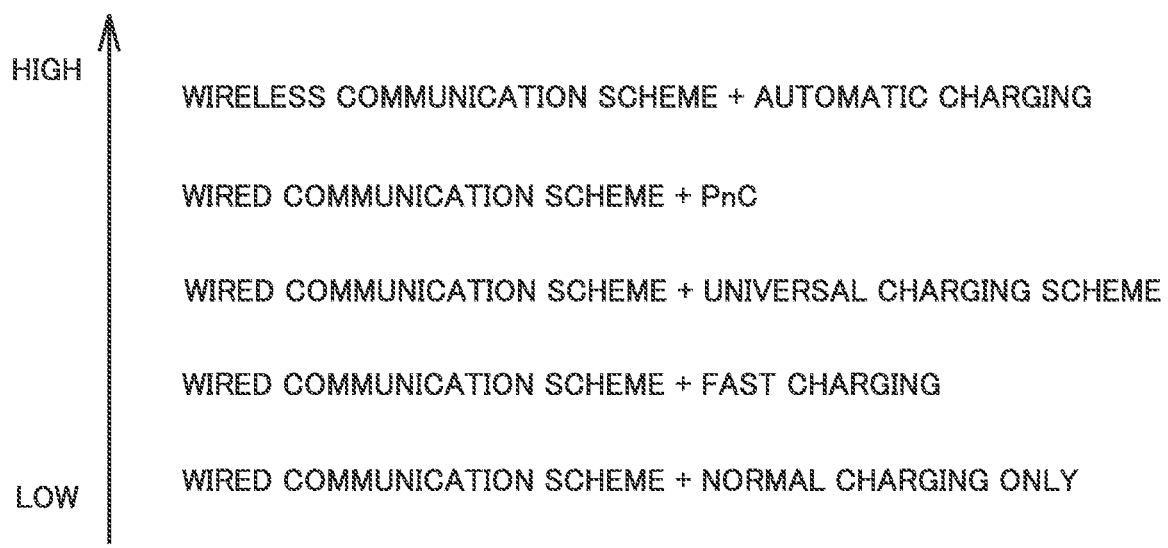
FIG. 3 is a diagram for illustrating priorities of charging standards according to the present embodiment.

FIG. 3 is a diagram for illustrating priorities of charging standards, according to the present embodiment. The priorities according to the present embodiment are as follows, starting from the highest priority to the lowest priority:
(1) Wireless communication scheme+Automatic charging;
(2) Wired communication scheme+PnC;
(3) Wired communication scheme+Universal charging scheme (no PnC);
(4) Wired communication scheme+Fast charging (no PnC); and
(5) Wired communication scheme+Normal charging (no PnC).

Highest Priority: Wireless Communication

Initially, regarding the priorities of the five possible charging standards listed above, the charging standard adapting a wireless communication scheme is set to have a higher priority (highest priority) than the charging standards adapting a wired communication scheme (the second to fourth highest priorities). Because, according to the charging standard adapting the wireless communication scheme, unlike the charging standards adapting the wired communication schemes, a connection attempt can be made and the communication between the charging station 8, 9 and the vehicle 1 can be established, without having to wait for the insertion of the charging plug of the charging station 8, 9 into the inlet unit 2 of the vehicle 1 by user manipulation.

The wireless communication scheme is suitably combined with automatic charging because automatic charging requires wireless communication, while electric power is supplied via wired connection. More specifically, when the manual charging station 8 is used, a connection attempt may be made, using the insertion of the charging plug 82 into the inlet unit 2 as a trigger, while the implementation of automatic charging by the charging station 9 (automatic insertion of the charging plug 92 into the inlet unit 2) requires a communication to be established, without waiting for such user manipulation. Note that automatic charging may be fast charging or normal charging. Automatic charging is not limited to contact charging, and may be noncontact charging.

Examples of charging standards defining (or that can define) automatic charging include SAE 1772 (Type1), CCS (CCS1, CCS2), GB/T, or ChaoJi. Aiming at establishing a communication with the charging station 9 conforming to a charging standard defining the automatic charging, the vehicle 1 makes a connection attempt by means of wireless communication. Specifically, the vehicle 1 makes a wireless fidelity (Wi-Fi) (registered trademark) protocol-compliant or a Bluetooth low energy (BLE) (registered trademark) protocol-compliant connection attempt.

Second Highest Priority: Plug & Charge

Among the charging standards adapting the wired communication schemes, the charging standard defining "Plug & Charge (PnC)" is set to have a higher priority (the second highest priority), whether fast charging or normal charging. Plug & Charge refers to an electric power charge feature for which automated billing is available. The reason for this can be explained as follows:

External charging according to a charging standard not conforming to Plug & Charge requires a user authentication process, such as swiping an IC (integrated circuit) card or a credit card in a card reader or launching a dedicated application on smartphone, etc., prior to the start of charging. In contrast, with Plug & Charge, such an authentication process can be obviated and the charging can be initiated upon insertion of the charging plug by previously having the identification information of the vehicle 1 (such as a public key certificate unique to the vehicle 1) registered with the vehicle 1 and previously registering the information (such as bank account information) related to the payment for the expense of external charging. Accordingly, in the present embodiment, the charging standard conforming to Plug & Charge is set to have a higher priority (the second highest priority) than the priority (the third or fourth highest priority) of the charging standard non-conforming to Plug & Charge. This can reduce time and effort involved in the authentication process, thereby allowing improvement in user convenience.

Examples of the charging standard conforming to (or that can conform to) Plug & Charge include CCS (CCS1, CCS2), ChaoJi, etc. CCS conforming to Plug & Charge can adopt power line communication (PLC) or Ethernet (registered trademark). ChaoJi conforming to Plug & Charge can adopt Ethernet or internet protocol over controller area network (IPoverCAN). Accordingly, aiming at establishing a communication with the charging station 8 conforming to the charging standard conforming to Plug & Charge, the vehicle 1 makes a PLC protocol-compliant, Ethernet protocol-compliant, or IPoverCAN protocol-compliant connection attempt.

Third Highest Priority: Universal Charging Scheme

Among the charging standards, there exists a "universal charging scheme" charging standard that defines both fast charging and normal charging. In the present embodiment, a charging standard that conforms to the universal charging scheme not conforming to Plug & Charge is set to have the third highest priority. A charging standard that is not the universal charging scheme but conforms to the fast charging is set to have the fourth highest priority.

Examples of the charging standard conforming to (or that can conform to) the universal charging scheme include CCS (CCS1, CCS2), ChaoJi, etc. The CCS not conforming to Plug & Charge can adopt PLC or Ethernet. ChaoJi not conforming to Plug & Charge can adopt Controller Area Network (CAN), Ethernet, or IPoverCAN. Accordingly, aiming at establishing a communication with the charging station 8 conforming to the charging standard adapting the universal charging scheme, the vehicle 1 makes a CAN protocol-compliant, PLC protocol-compliant, Ethernet protocol-compliant, or IPoverCAN protocol-compliant connection attempt.

Note that, using the PLC, external charging can be controlled in a more sophisticated manner than when using the CAN, such as allowing thorough setting of a charging profile (changes in charging current over time). Accordingly, in the present embodiment, the charging standard adapting the universal charging scheme is set to have a higher priority than the charging standard defining only the fast charging. This allows the capability of the charging station for controlling the charging current to be fully exploited.

Fourth Highest Priority: Fast Charging

The fast charging that is not of the universal charging scheme nor conforming to Plug & Charge is set to have the fourth highest priority. Examples of the charging standard defining the fast charging not conforming to Plug & Charge include CHAdeMO, GB/T, CCS (CCS1, CCS2), ChaoJi, etc. CHAdeMO adopts CAN. GB/T adopts CAN. CCS adopts not only PLC, but also Ethernet. ChaoJi can adopt CAN, Ethernet, or IPoverCAN. Accordingly, aiming at establishing a communication with the charging station 8 conforming to the fast charging standard not conforming to Plug & Charge, the vehicle 1 makes a CAN protocol-compliant, PLC protocol-compliant, Ethernet protocol-compliant, or IPoverCAN protocol-compliant connection attempt.

Fifth Highest Priority: Normal Charging

A charging standard that does not conform to Plug & Charge and defines only normal charging is set to have the lowest priority (the fifth highest priority). This is because the normal charging is considered as yielding low user convenience in that the normal charging requires a longer charging time than fast charging. Examples of a charging standard that does not conform to Plug & Charge and defines only normal charging include SAE J1772 (Type 1), GB/T, etc. These charging standards adopt a communication protocol that uses a control pilot line (CPLT) signal. The CPLT signal is a type of a PWM (pulse width modulation) control signal. Aiming at establishing a communication with the charging station 8 conforming to a charging standard defining only normal charging, the vehicle 1 makes a CPLT-signal-based connection attempt.

Control Flow

Figure 4:
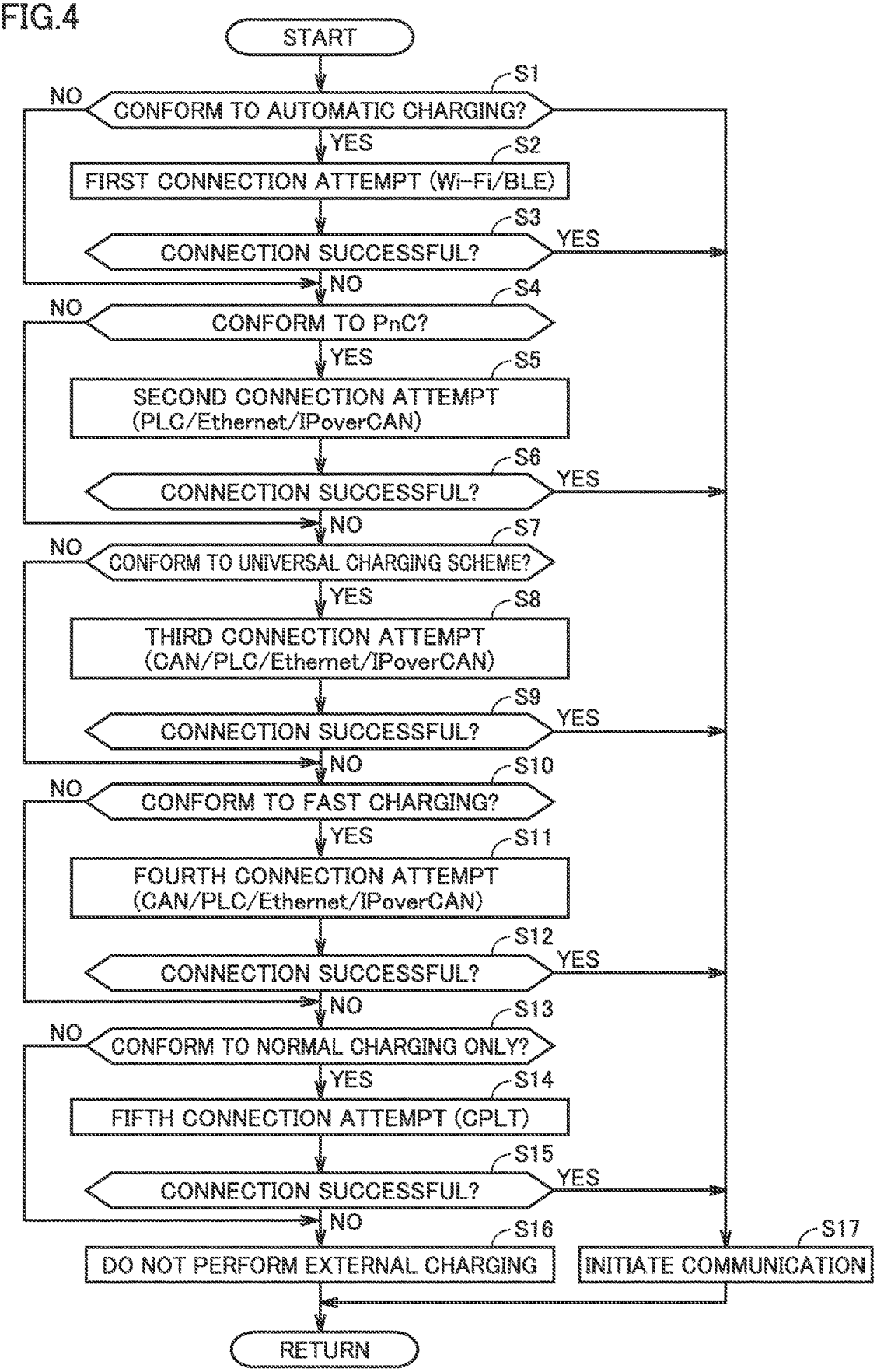
FIG. 4 is a flowchart illustrating a connection process between a vehicle 1 and a charging station, according to the present embodiment.

FIG. 4 is a flowchart illustrating a communication connection process between the vehicle 1 and a charging station, according to the present embodiment. The process illustrated in the flowchart (and the flowchart of FIG. 6 described later, etc.) is repeated for every predetermined computation period, for example. Each process step is implemented by software processing by the ECU 10. However, each process step may be implemented by hardware (an electric circuit) created within the ECU 10. Hereinafter, each process step is abbreviated as S.

First Connection Attempt

In S1, the ECU 10 determines whether the vehicle 1 conforms to a charging standard defining the automatic charging. The ECU 10 is able to make this determination because the ECU 10 knows beforehand which charging standard the vehicle 1 conforms to, based on the specifications of the vehicle 1. The same is true for the subsequent process steps (the process steps of S4, S7, S10, and S13) for determining whether the vehicle 1 conforms to other charging standards.

If the vehicle 1 conforms to a charging standard defining the automatic charging (YES in S1), the ECU 10 makes a connection attempt (a first connection attempt) according to a Wi-Fi protocol-compliant or BLE protocol-compliant wireless communication scheme (S2). If a communication connection to the charging station 9 is successful at the first connection attempt (YES in S3), the ECU 10 initiates a Wi-Fi protocol-compliant or BLE protocol-compliant communication with the charging station 9 (S17).

Note that whether a communication connection is successful at the first connection attempt can be determined according to a procedure (e.g., a timeout determination procedure) defined in a Wi-Fi protocol or a BLE protocol. The same is true for the other connection attempts described later.

If a communication connection to the charging station 9 fails at the first connection attempt due to, for example, the charging station 9 not existing around the vehicle 1 (NO in S3), the ECU 10 passes the process to S4. If the vehicle 1 does not conform to the charging standard defining the automatic charging (NO in S1), the ECU 10 skips the process steps of S2 and S3, and passes the process to S4.

Second Connection Attempt

In S4, the ECU 10 determines whether the vehicle 1 conforms to a charging standard defining Plug & Charge (PnC). If the vehicle 1 conforms to a charging standard defining Plug & Charge (YES in S4), the ECU 10 makes a PLC protocol-compliant, Ethernet protocol-compliant, or IPoverCAN protocol-compliant connection attempt (a second connection attempt) (S5). If a communication connection to the charging station 8 is successful at the second connection attempt (YES in S6), the ECU 10 initiates a PLC protocol-compliant, Ethernet protocol-compliant, or IPoverCAN protocol-compliant communication with the charging station 8 (S17).

If a communication connection to the charging station 8 fails at the second connection attempt (NO in S6), the ECU 10 passes the process to S7. If the vehicle 1 does not conform to a charging standard defining Plug & Charge (NO in S4), the ECU 10 skips the process steps of S5 and S6, and passes the process to S7.

Third Connection Attempt

In S7, the ECU 10 determines whether the vehicle 1 conforms to a charging standard which adapts the universal charging scheme and does not define Plug & Charge. If the vehicle 1 conforms to the charging standard adapting the universal charging scheme (YES in S7), the ECU 10 makes a CAN protocol-compliant, PLC protocol-compliant, Ethernet protocol-compliant, or IPoverCAN protocol-compliant connection attempt (a third connection attempt) (S8), provided that, for the third connection attempt, a communication protocol different from the communication protocol used at the second connection attempt is used, among a CAN protocol, a PLC protocol, an Ethernet protocol, and a IPoverCAN protocol. If a communication connection to the charging station 8 is successful at the third connection attempt (YES in S8), the ECU 10 initiates a CAN protocol-compliant, PLC protocol-compliant, Ethernet protocol-compliant, or IPoverCAN protocol-compliant communication with the charging station 8 (S17).

If a communication connection to the charging station 8 fails at the third connection attempt (NO in S9), the ECU 10 passes the process to S10. If the vehicle 1 does not conform to the charging standard adapting the universal charging scheme (NO in S7), the ECU 10 skips the process steps of S8 and S9, and passes the process to S10.

Fourth Connection Attempt

In S7, the ECU 10 determines whether the vehicle 1 conforms to a charging standard defining the fast charging. If the vehicle 1 conforms to the charging standard defining the fast charging (YES in S7), the ECU 10 makes a CAN protocol-compliant, PLC protocol-compliant, Ethernet protocol-compliant, or IPoverCAN protocol-compliant connection attempt (a fourth connection attempt) (S11), provided that, for the fourth connection attempt, a communication protocol different from ones used at the second connection attempt and the third connection attempt is used, among a CAN protocol, a PLC protocol, an Ethernet protocol, and a IPowerCAN protocol. If a communication connection to the charging station 8 is successful at the fourth connection attempt (YES in S11), the ECU 10 initiates a CAN protocol-compliant, PLC protocol-compliant, Ethernet protocol-compliant, or IPoverCAN protocol-compliant communication with the charging station 8 (S17).

If a communication connection to the charging station 8 fails at the fourth connection attempt (NO in S12), the ECU 10 passes the process to S13. If the vehicle 1 does not conform to the charging standard defining the fast charging (NO in S10), the ECU 10 skips the process steps of S11 and S12, and passes the process to S13.

Fifth Connection Attempt

In S13, the ECU 10 determines whether the vehicle 1 conforms to a charging standard defining only the normal charging. If the vehicle 1 conforms to a charging standard defining only the normal charging (YES in S13), the ECU 10 makes a CPLT-signal-based connection attempt (a fifth connection attempt) (S14). If a communication connection to the charging station 8 is successful at the fifth connection attempt (YES in S13), the ECU 10 initiates a communication with the charging station 8, using a CPLT signal (S17).

If a communication connection to the charging station 8 fails at the fifth connection attempt (NO in S15), that is, there exists no charging station a communication connection to which is successful. Thus, the ECU 10 does not perform external charging (S16). After the execution of the process step of S16 or S17, the ECU 10 returns the process to the main routine.

As described above, in the present embodiment, priorities are set to automatic charging, Plug & Charge, the universal charging scheme (not conforming to Plug & Charge), the fast charging (not conforming to Plug & Charge), and the normal charging (not conforming to Plug & Charge and the fast charging), which are for use in external charging of the vehicle 1, starting from the highest priority to the lowest priority. Setting the automatic charging to have the highest priority can obviate the need for manual connection of the charging cable, thereby allowing improvement in user convenience. Setting Plug & Charge to have the next highest priority can obviate the need for the authentication process for the billing, thereby allowing improvement in user convenience. Setting the charging standard defining the fast charging to have a higher priority than the charging standard defining only the normal charging reduces a required amount of time for external charging of the vehicle 1. Thus, according to the present embodiment, the vehicle can a suitable communication scheme and leverage the features that can be provided by the charging station.

However, the vehicle 1 may not conform to all the five possible charging standards stated above. The vehicle 1 may conform to any two or more possible charging standards among the five possible charging standards. In this case, the process related to the charging standard to which the vehicle 1 conforms can be extracted from the series of process steps illustrated in the flowchart of FIG. 4. As one example, if the vehicle 1 does not support the normal charging, one should readily understand that another flowchart (a flowchart comprising S1 through S12, S16, and S17), not including the process steps of S13 through S15, may be used.

Example 1

ChaoJi+CHAdeMO

In many cases, the number of charging standards which the vehicle 1 conforms to is less than the number of charging standards described in the embodiment (five charging standards in total). In Examples 1 to 4 below, a configuration of a vehicle will be described in detail which conforms to some of the charging standards described in the embodiment.

Figure 5:
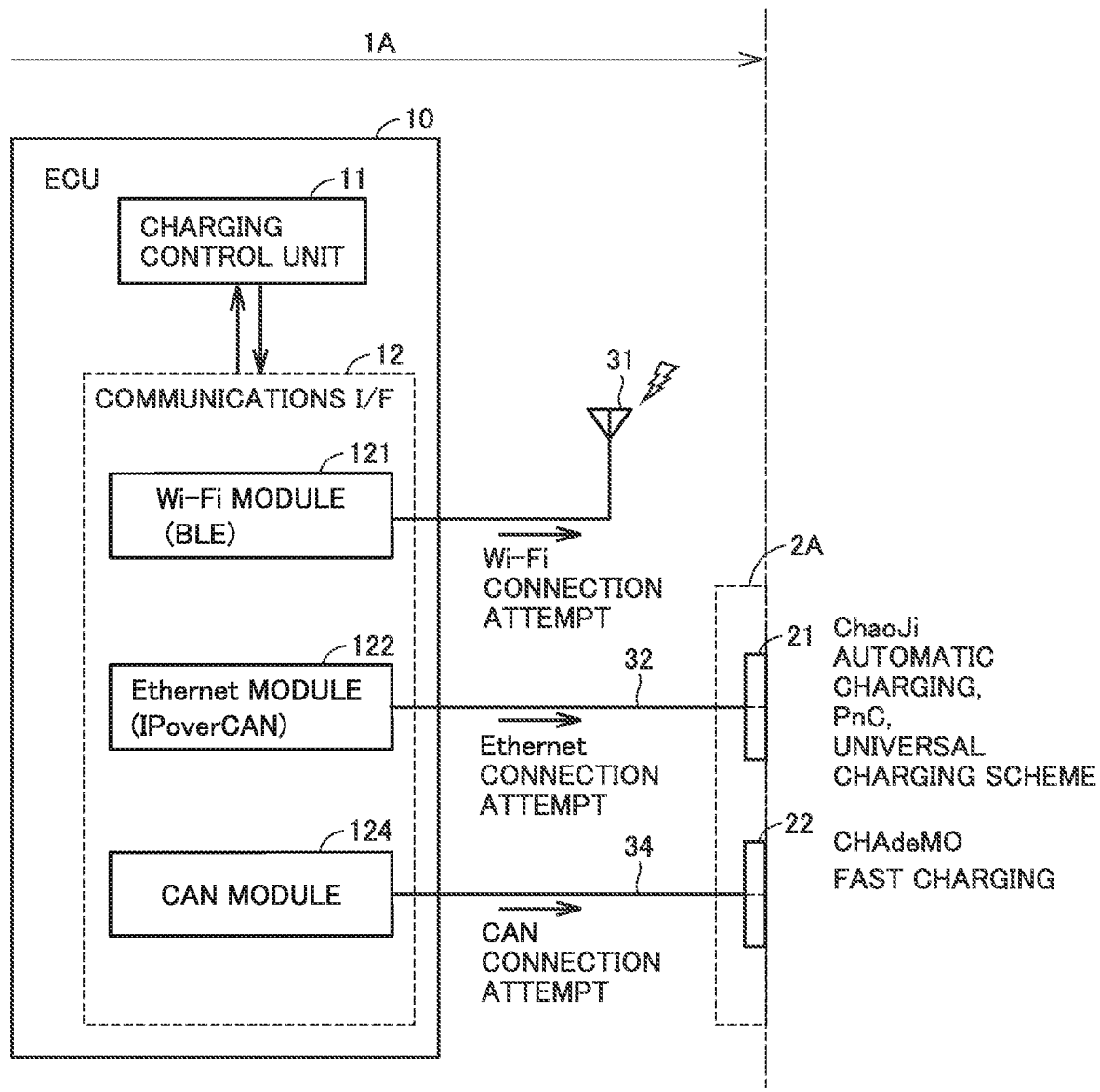
FIG. 5 is a block diagram schematically showing a configuration related to external charging of a vehicle according to Example 1.

FIG. 5 is a block diagram schematically showing a configuration related to external charging of a vehicle 1A, according to Example 1. The vehicle 1A includes an inlet unit 2A which includes inlets 21 and 22. The inlet 21 conforms to ChaoJi defining automatic charging and Plug & Charge. In addition to this, the inlet 21 is also used for external charging in accordance with ChaoJi universal charging scheme. In contrast, the inlet 22 conforms to CHAdeMO defining only the fast charging.

FIG. 5 also shows a functional block diagram of the ECU 10. The ECU 10 includes a charging control unit 11 and a communications interface 12. The charging control unit 11 controls the external charging capability of the vehicle 1, and controls the communications interface 12. The communications interface 12 includes a Wi-Fi module 121, an Ethernet module 122, and a CAN module 124.

The Wi-Fi module 121 is capable of a Wi-Fi protocol-compliant communication, using a Wi-Fi antenna 31. The charging control unit 11 controls the Wi-Fi module 121, thereby outputting a Wi-Fi connection attempt to the charging station 9. If a communication connection is successful at the Wi-Fi connection attempt, the charging plug 92 is automatically inserted into the inlet 21. Note that the communications interface 12 may include a BLE module, instead of the Wi-Fi module 121.

The Ethernet module 122 is connected to the inlet 21 by an Ethernet signal line 32. The Ethernet module 122 is capable of an Ethernet protocol-compliant communication adopted by ChaoJi. With the charging plug 82 connected to the inlet 21 by user manipulation, the charging control unit 11 controls the Ethernet module 122 so that the Ethernet module 122 outputs an Ethernet connection attempt to the charging station 8 via the inlet 21. Note that the communications interface 12 may include an IPoverCAN module, instead of the Ethernet module 122.

The CAN module 124 is connected to the inlet 22 by a CAN signal line 34. The CAN module 124 is capable of a CAN protocol-compliant communication adopted by CHAdeMO. With the charging plug 82 connected to the inlet 22 by user manipulation, the charging control unit 11 controls the CAN module 124 so that the CAN module 124 outputs a CAN connection attempt to the charging station 8 via the inlet 22.

Figure 6:
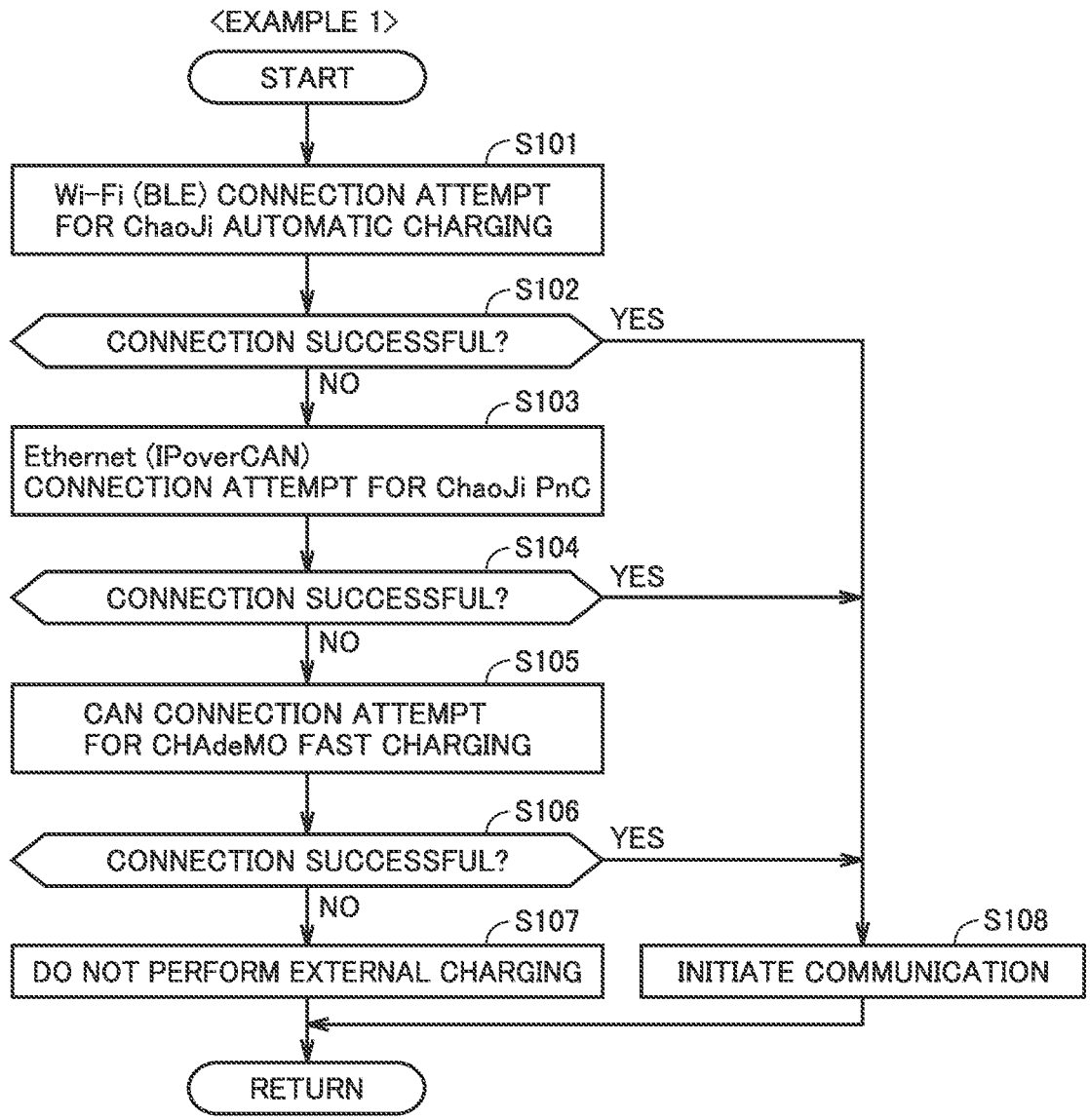
FIG. 6 is a flowchart illustrating a communication connection process between the vehicle and a charging station, according to Example 1.

FIG. 6 is a flowchart illustrating a communication connection process between the vehicle 1A and a charging station, according to Example 1. In S101, the ECU 10 makes a Wi-Fi connection attempt (or a BLE connection attempt) for using the ChaoJi automatic charging. If a communication connection to the charging station 9 is successful at the Wi-Fi connection attempt (YES in S102), the ECU 10 communicates with the charging station 9 in conformity with the Wi-Fi communication protocol (S108).

If a communication connection to the charging station 9 fails at the Wi-Fi connection attempt (NO in S102), the ECU 10 makes an Ethernet connection attempt (or an IPoverCAN connection attempt) for using ChaoJi Plug & Charge (S103). If a communication connection to the charging station 8 is successful at the Ethernet connection attempt (YES in S104), the ECU 10 communicates with the charging station 8 in conformity with the Ethernet communication protocol (S108).

If a communication connection to the charging station 8 fails at the Ethernet connection attempt (NO in S104), the ECU 10 makes a CAN connection attempt using CHAdeMO fast charging (S105). If a communication connection to the charging station 8 is successful at the CAN connection attempt (YES in S106), the ECU 10 communicates with the charging station 8 in conformity with the CAN communication protocol (S108).

If a communication connection to the charging station 8 fails at the CAN connection attempt (NO in S106), the ECU 10 does not perform external charging (S107). After the execution of the process step of S107 or S108, the ECU 10 returns the process to the main routine.

Example 2

ChaoJi+GB/T

Figure 7:
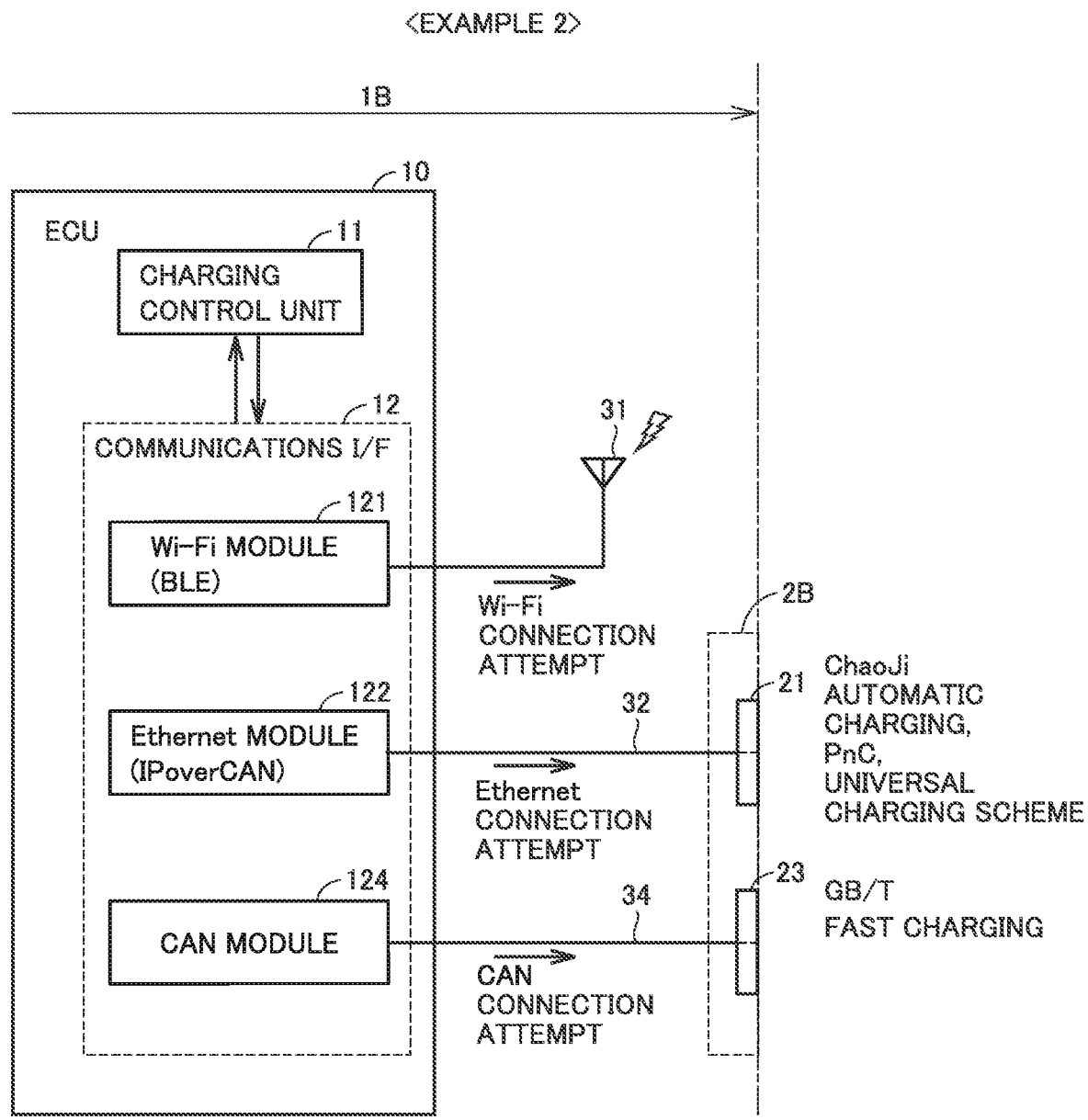
FIG. 7 is a block diagram schematically showing a configuration related to external charging of a vehicle, according to Example 2.

FIG. 7 is a block diagram schematically showing a configuration related to external charging of a vehicle 1B, according to Example 2. The vehicle 1B includes an inlet unit 2B which includes inlets 21 and 23. As with Example 1, the inlet 21 conforms to ChaoJi defining the automatic charging, Plug & Charge, and the universal charging scheme. In contrast, the inlet 23 conforms to GB/T defining the fast charging.

The CAN module 124 is connected to the inlet 23 by the CAN signal line 34. The CAN module 124 is capable of a CAN protocol-compliant communication adopted by GB/T. With the charging plug 82 connected to the inlet 23 by user manipulation, the charging control unit 11 controls the CAN module 124 so that the CAN module 124 outputs a CAN connection attempt to the charging station 8 via the inlet 23. The other configuration related to the external charging is the same as a corresponding configuration according to Example 1 (see FIG. 5).

Figure 8:
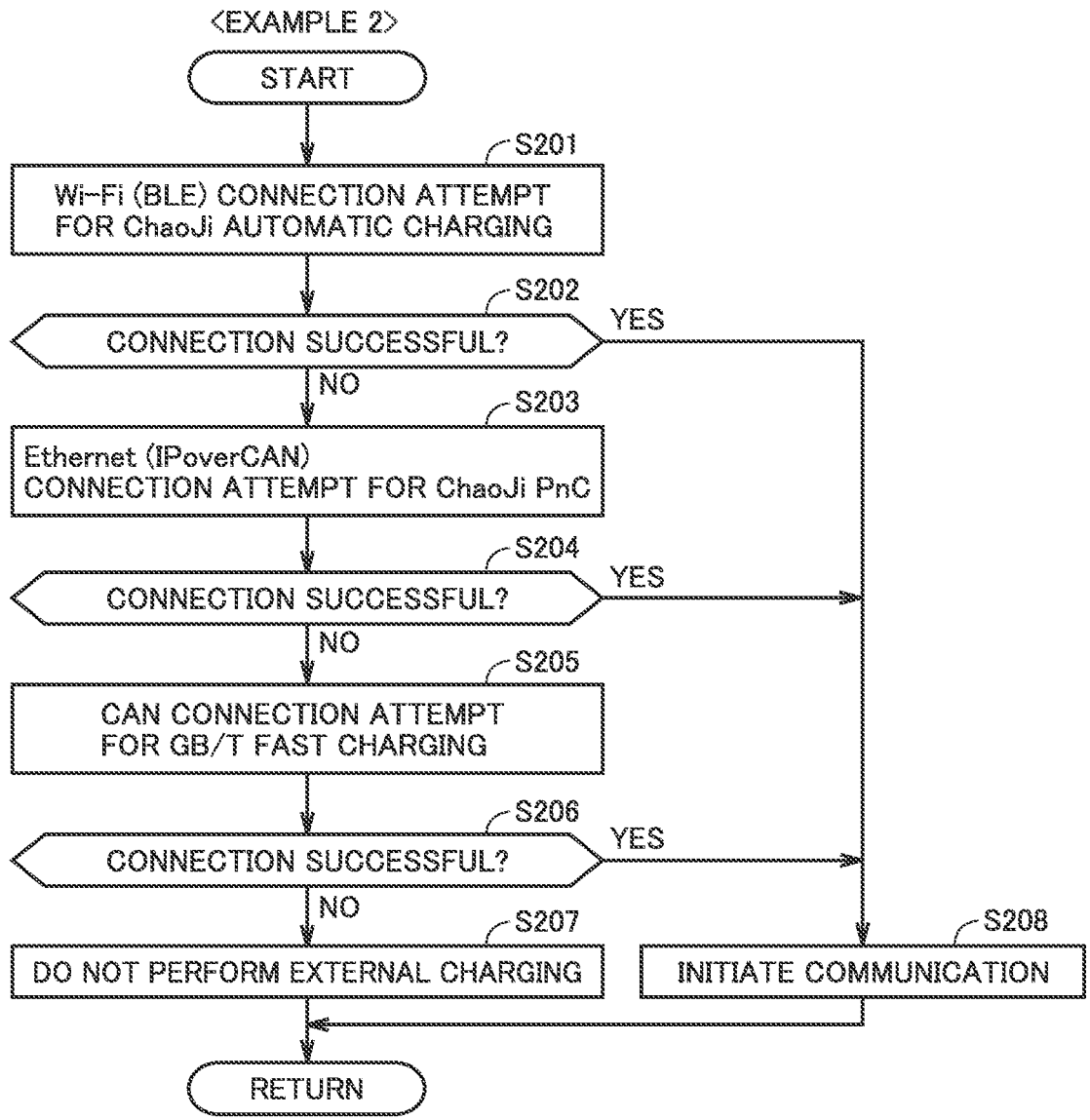
FIG. 8 is a flowchart illustrating a communication connection process between the vehicle and a charging station, according to Example 2.

FIG. 8 is a flowchart illustrating a communication connection process between the vehicle 1B and a charging station, according to Example 2. The flowchart is the same as the flowchart according to Example 1 (see FIG. 6), except for including the process step of S205, instead of the process step of S105.

If a communication connection to the charging station 8 fails at an Ethernet connection attempt (NO in S204), the ECU 10 makes a CAN connection attempt for using the GB/T fast charging (S205). If a communication connection to the charging station 8 is successful at the CAN connection attempt (YES in S206), the ECU 10 communicates with the charging station 8 in conformity with the CAN communication protocol (S208). The process steps, other than the above, of the communication connection process according to Example 2 are the same as corresponding process steps according to Example 1 (see FIG. 8), and detailed description of which will thus not be repeated.

Example 3

CCS Only

Figure 9:
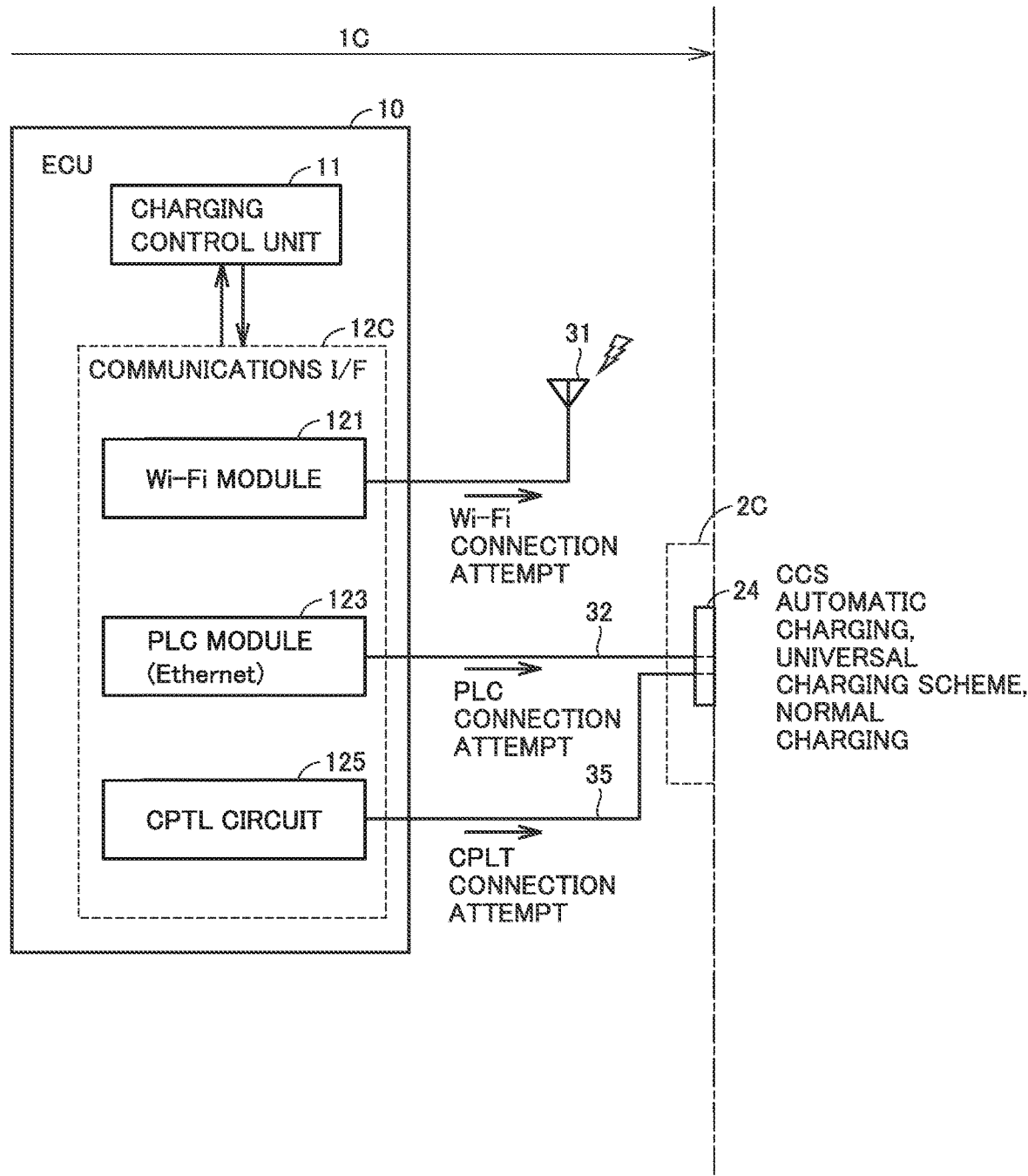
FIG. 9 is a block diagram schematically showing a configuration related to external charging of a vehicle, according to Example 3.

FIG. 9 is a block diagram schematically showing a configuration related to external charging of a vehicle 1C, according to Example 3. The vehicle 1C includes an inlet unit 2C which includes an inlet 24. The inlet 24 conforms to CCS defining the automatic charging, the universal charging scheme, and only normal charging.

A communications interface 12C includes a Wi-Fi module 121, a PLC module 123, and a control pilot circuit 125. The Wi-Fi module 121 and the PLC module 123 are the same as corresponding modules according to Example 1. However, the communications interface 12C may include an Ethernet module, instead of the PLC module 123.

The control pilot circuit 125 is connected to the inlet 24 by a CPLT signal line 35. For example, the control pilot circuit 125 includes resistors and switches (not shown) and capable of operating the potential of a CPLT signal. With the charging plug 82 connected to the inlet 24 by user manipulation, the charging control unit 11 controls the control pilot circuit 125 so that the control pilot circuit 125 outputs a CPLT connection attempt to the charging station 8 via the inlet 24.

Figure 10:
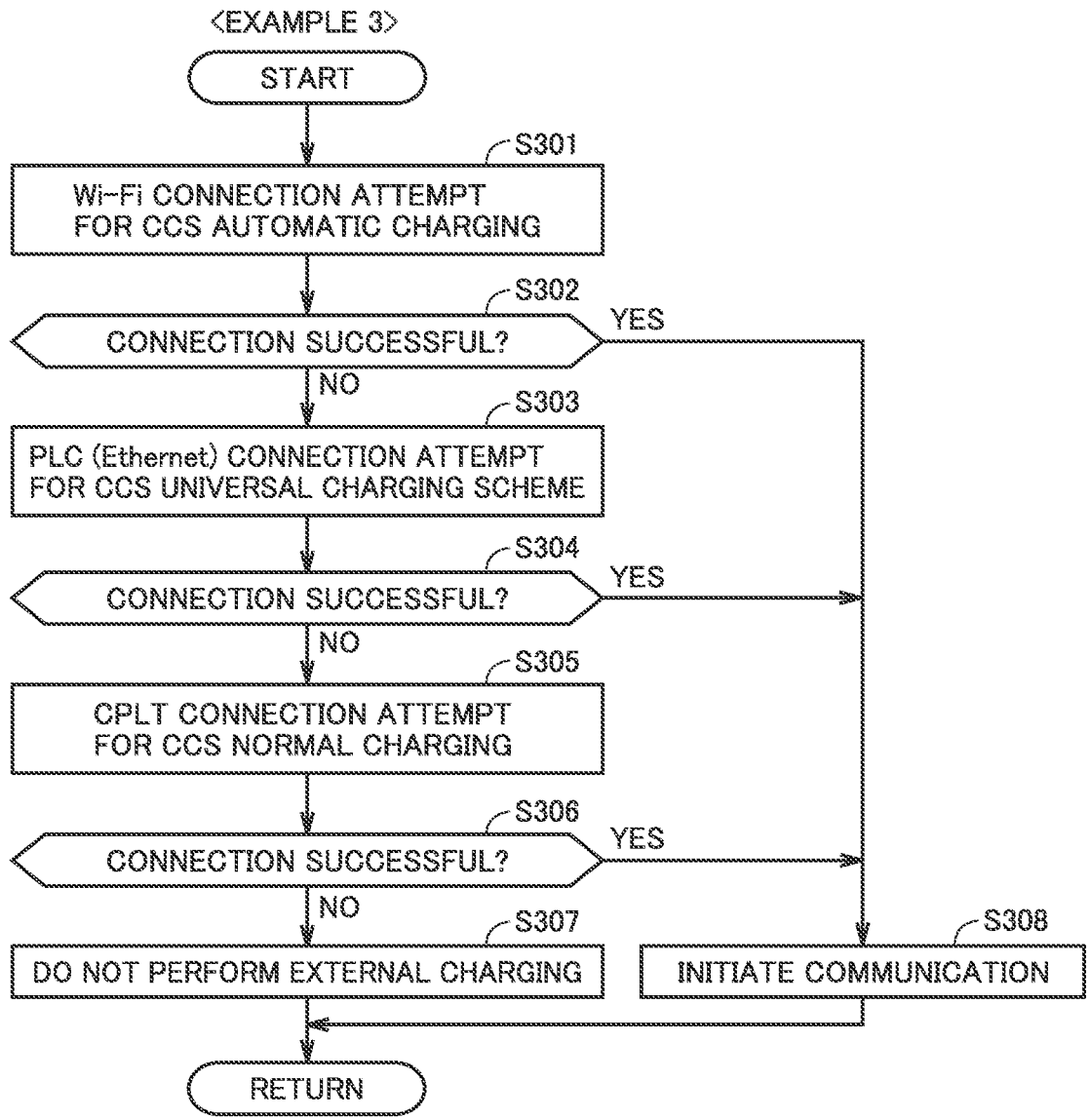
FIG. 10 is a flowchart illustrating a communication connection process between the vehicle and a charging station, according to Example 3.

FIG. 10 is a flowchart illustrating a communication connection process between the vehicle 1C and a charging station, according to Example 3. In S301, the ECU 10 makes a Wi-Fi connection attempt for using the CCS automatic charging. If a communication connection to the charging station 9 is successful at the Wi-Fi connection attempt (YES in S302), the ECU 10 communicates with the charging station 9 in conformity with the Wi-Fi communication protocol (S308).

If a communication connection to the charging station fails at the Wi-Fi connection attempt (NO in S302), the ECU 10 makes a PLC connection attempt (an Ethernet connection attempt) for using the CCS universal charging scheme (S303). If a communication connection to the charging station 8 is successful at the PLC connection attempt (YES in S304), the ECU 10 communicates with the charging station 8 in conformity with the PLC communication protocol (S308).

If a communication connection to the charging station 8 fails at the PLC connection attempt (NO in S304), the ECU 10 makes a CPLT connection attempt for using the CCS normal charging (S305). If a communication connection to the charging station 8 is successful at the CPLT connection attempt (YES in S306), the ECU 10 communicates with the charging station 8, using a CPLT signal (S308).

If a communication connection to the charging station 8 fails at the CPLT connection attempt (NO in S306), the ECU 10 does not perform external charging (S307). After the execution of the process step of S307 or S308, the ECU 10 returns the process to the main routine.

Example 4

ChaoJi Only

Figure 11:
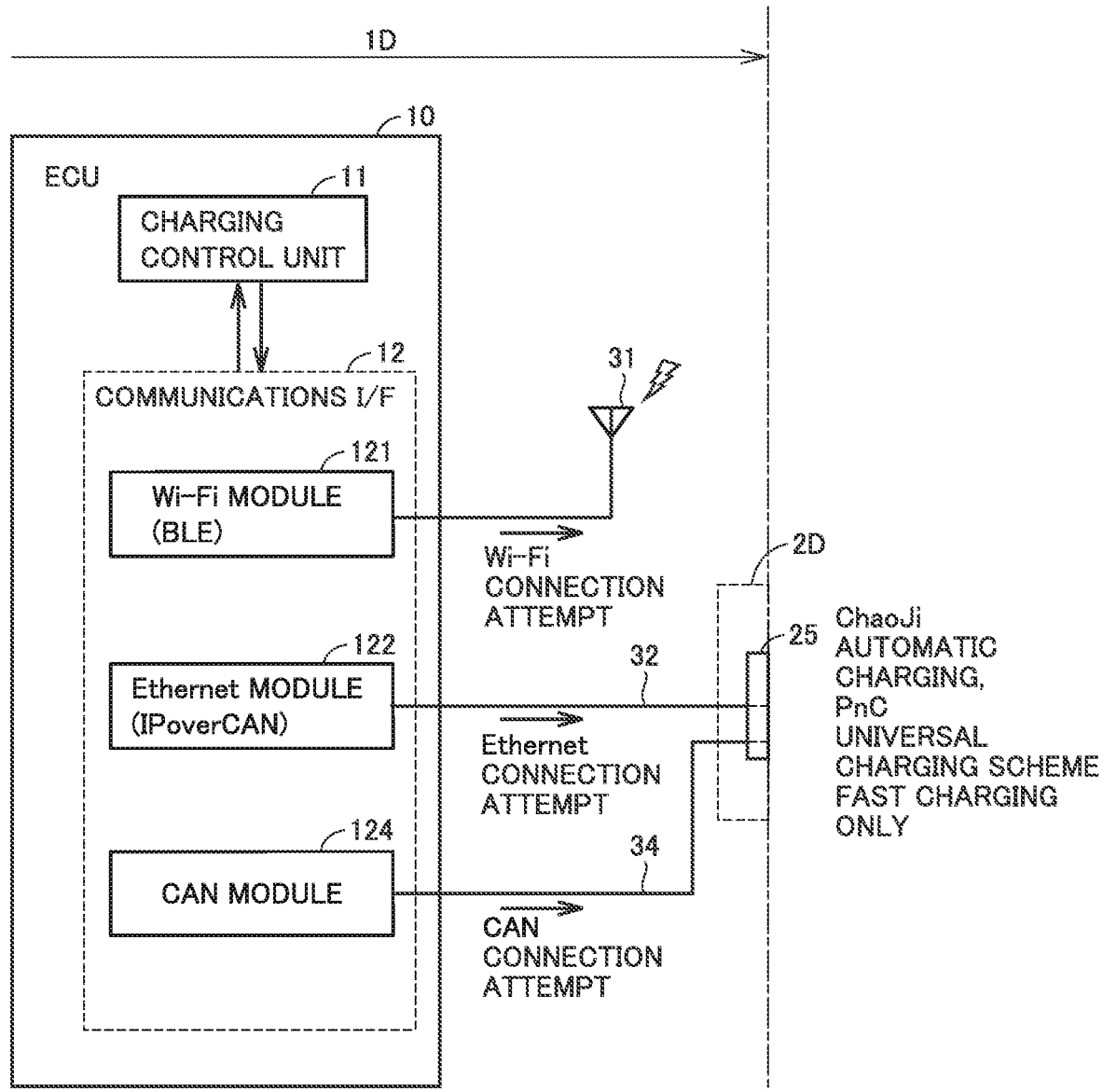
FIG. 11 is a block diagram schematically showing a configuration related to external charging of a vehicle, according to Example 4.

FIG. 11 is a block diagram schematically showing a configuration related to external charging of a vehicle 1D, according to Example 4. The vehicle 1D includes an inlet unit 2D which includes an inlet 25. The inlet 25 conforms to ChaoJi defining the automatic charging, Plug & Charge, the universal charging scheme, and only normal charging. Note that, as with Example 1 (see FIG. 5), the communications interface 12 may include a BLE module, instead of the Wi-Fi module 121, and an IPoverCAN module, instead of the Ethernet module 122.

The CAN module 124 is connected to the inlet 25 by a CAN signal line 34. The CAN module 124 is capable of a CAN protocol-compliant communication adopted by ChaoJi. With the charging plug 82 connected to the inlet 25 by user manipulation, the charging control unit 11 controls the CAN module 124 so that the CAN module 124 outputs a CAN connection attempt to the charging station 8 via the inlet 25.

FIG. 12 is a flowchart illustrating a communication connection process between the vehicle 1D and a charging station, according to Example 4. The flowchart is the same as the flowchart according to Example 1 (see FIG. 6), except for including the process step of S407, instead of the process step of S107.

If a communication connection to the charging station 8 fails at an Ethernet connection attempt (NO in S404), the ECU 10 makes a CAN connection attempt for using the ChaoJi fast charging (S405). If a communication connection to the charging station 8 is successful at the CAN connection attempt (YES in S406), the ECU 10 communicates with the charging station 8 in conformity with the CAN communication protocol (S408). The process steps, other than the above, of the communication connection process according to Example 4 are the same as corresponding process steps according to Example 1, and detailed description of which will thus not be repeated.

Note that, even in Examples 1 to 4, the vehicle may not conform to all the charging standards described in the respective flowcharts, and may conform to any two or more possible charging standards. The process related to the charging standard to which the vehicle conforms can be extracted from the series of process steps illustrated in the flowcharts of Examples 1 to 4.

While the embodiment according to the present disclosure has been described above, the presently disclosed embodiment should be considered in all aspects illustrative and not restrictive. The scope of the present disclosure is indicated by the appended claims, and all changes that come within the scope of the claims and the meaning and range of equivalency of the claims are intended to be embraced within their scope.

What is claimed is:

1. A method for controlling charging of a vehicle using electric power supplied from charging equipment, wherein
    the vehicle conforms to a plurality of charging standards;
    the plurality of charging standards include a charging standard adapting a wireless communication scheme and a charging standard adapting a wired communication scheme,
    the method, comprising:
    performing a first connection attempt process for establishing a communication between the vehicle and the charging equipment, in accordance with a communication scheme adopted by a charging standard that has a predetermined highest priority among the plurality of charging standards; and
    performing, when the communication between the vehicle and the charging equipment is not established at the first connection attempt process, a second connection attempt process in accordance with a communication scheme adopted by a charging standard that has a second highest priority among the plurality of charging standards, wherein
    the charging standard adapting the wireless communication scheme has a higher priority than the charging standard adapting the wired communication scheme.

2. The method according to claim 1, wherein
    the charging standard adapting the wireless communication scheme includes a first charging standard,
    the charging standard adapting the wired communication scheme includes at least one charging standard, among a second charging standard, a third charging standard, a fourth charging standard, and a fifth charging standard different from each other,
    the first charging standard is a charging standard which adapts a wireless communication scheme and defines automatic charging in which a charging plug of the charging equipment is inserted into an inlet of the vehicle without user manipulation,
    the second charging standard is a charging standard which adapts a wired communication scheme and defines: manual charging in which the charging plug is inserted into the inlet through the user manipulation; and Plug & Charge in which charging of the vehicle starts once the charging plug is inserted into the inlet, obviating user authentication,
    the third charging standard is a charging standard which adapts a wired communication scheme and defines direct-current (DC) charging and alternating-current (AC) charging,
    the fourth charging standard is a charging standard which adapts a wired communication scheme and defines only the DC charging among the DC charging and the AC charging,
    the fifth charging standard is a charging standard which adapts a wired communication scheme and defines only the AC charging among the DC charging and the AC charging, and
    the first charging standard has a higher priority than the second charging standard, the third charging standard, the fourth charging standard, and the fifth charging standard.

3. The method according to claim 2, wherein
    priorities of the first charging standard, the second charging standard, the third charging standard, the fourth charging standard, and the fifth charging standard are in order starting from a highest priority to a lowest priority.

4. The method according to claim 3, further comprising
    performing, when no communication is established between the vehicle and the charging equipment at the second connection attempt process, a third connection attempt process in accordance with a communication scheme adopted by a charging standard that has a third highest priority among the plurality of charging standards.

5. The method according to claim 4, further comprising
    performing, when no communication is established between the vehicle and the charging equipment at the third connection attempt process, a fourth connection attempt process in accordance with a communication scheme adopted by a charging standard that has a fourth highest priority among the plurality of charging standards.

6. The method according to claim 5, further comprising
    performing, when no communication is established between the vehicle and the charging equipment at the fourth connection attempt process, a fifth connection attempt process in accordance with a communication scheme adopted by a charging standard that has a lowest priority among the plurality of charging standards.

7. The method according to claim 1, wherein
    the wireless communication scheme adopts a wireless fidelity (Wi-Fi) protocol or a Bluetooth low energy (BLE) protocol, and
    the wired communication scheme adopts a controller area network (CAN) protocol, a power line communication (PLC) protocol, an Ethernet protocol, an Internet protocol over controller area network (IPoverCAN) protocol, or a communication protocol which uses a control pilot signal.

8. An apparatus for controlling charging of a vehicle using electric power supplied from charging equipment, wherein the vehicle conforms to a plurality of charging standards;
the plurality of charging standards include a charging standard adapting a wireless communication scheme and a charging standard adapting a wired communication scheme,
the apparatus:
performs a first connection attempt process for establishing a communication between the vehicle and the charging equipment, in accordance with a communication scheme adopted by a charging standard that has a highest predetermined priority among the plurality of charging standards; and
performs, when the communication between the vehicle and the charging equipment is not established at the first connection attempt process, a second connection attempt process in accordance with a communication scheme adopted by a charging standard that has a second highest priority among the plurality of charging standards, wherein
the charging standard adapting the wireless communication scheme has a higher priority than the charging standard adapting the wired communication scheme.

9. The apparatus according to claim 8, wherein
the charging standard adapting the wireless communication scheme includes a first charging standard,
the charging standard adapting the wired communication scheme includes at least one charging standard, among a second charging standard, a third charging standard, a fourth charging standard, and a fifth charging standard different from each other,
the first charging standard is a charging standard which adapts a wireless communication scheme and defines automatic charging in which a charging plug of the charging equipment is inserted into an inlet of the vehicle without user manipulation,
the second charging standard is a charging standard which adapts a wired communication scheme and defines: manual charging in which the charging plug is inserted into the inlet through the user manipulation; and Plug & Charge in which charging of the vehicle starts once the charging plug is inserted into the inlet, obviating user authentication,
the third charging standard is a charging standard which adapts a wired communication scheme and defines direct-current (DC) charging and alternating-current (AC) charging,
the fourth charging standard is a charging standard which adapts a wired communication scheme and defines only the DC charging among the DC charging and the AC charging,
the fifth charging standard is a charging standard which adapts a wired communication scheme and defines only the AC charging among the DC charging and the AC charging, and
the first charging standard has a higher priority than the second charging standard, the third charging standard, the fourth charging standard, and the fifth charging standard.

10. The apparatus according to claim 9, wherein
priorities of the first charging standard, the second charging standard, the third charging standard, the fourth charging standard, and the fifth charging standard are in order starting from a highest priority to a lowest priority.

* * * * *